Dec. 22, 1953    R. P. DE ANTHONY    2,663,862
BATTERY INDICATOR
Filed July 10, 1950
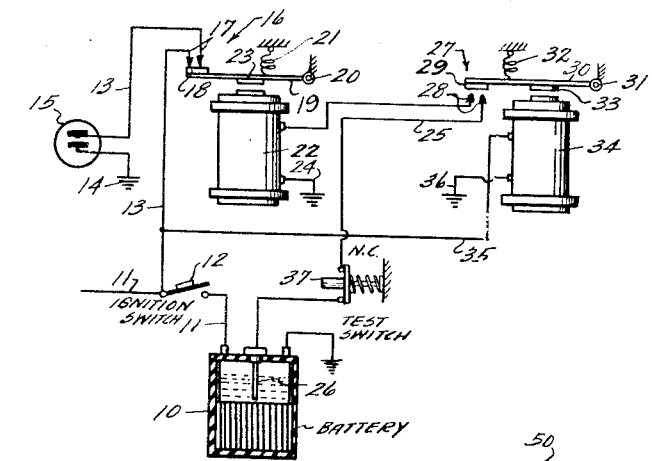
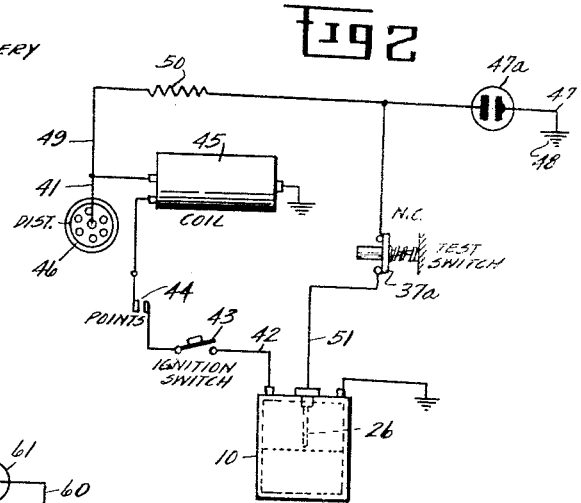
INVENTOR.
ROBERT P. DEANTHONY
BY
ATTORNEY Patented Dec. 22, 1953

2,663,862

UNITED STATES PATENT OFFICE 2,663,862

BATTERY INDICATOR

Robert P. De Anthony, Dayton, Ohio

Application July 10, 1950, Serial No. 172,889

3 Claims. (Cl. 340—249)

This invention relates to a signaling device for indicating the level of the electrolyte in a battery and is designed primarily for use with automobile batteries which supply current to the ignition system and to the other instrumentalities, but may be used in connection with various types of apparatus in which a wet cell battery is employed.

One object of the invention is to provide a signaling device which is so controlled by the level of the electrolyte in the battery that it will be actuated when the electrolyte has fallen to such a level as to require prompt replenishment.

A further object of the invention is to provide a signaling device having a normally open circuit so that it will draw current from the battery only when energized due to the low level of the electrolyte.

A further object of the invention is to provide such a signaling device in which the signal circuit will be controlled by a relay which is connected in circuit with an electrode, a portion of which is immersed in the electrolyte.

A further object of the invention is to provide a signaling device including a relay controlled by the electrode circuit to maintain the signal circuit normally open, and a second relay energized by the battery current to control the energization of the first mentioned relay.

A further object of the invention is to provide a signaling device which will be controlled by the electrode circuit without the use of relays.

Other objects of the invention may appear as the apparatus is described in detail.

In the accompanying drawings, Fig. 1 is a diagrammatic illustration of a signal mechanism embodying the invention; Fig. 2 is a diagrammatic illustration of a modified form of the invention; Fig. 3 is a diagrammatic illustration of a third form of the invention; Fig. 4 is a diagrammatic illustration of a fourth form of the invention; and Fig. 5 is a sectional view showing the mounting for the electrode.

In these drawings I have illustrated one embodiment of my invention, together with several modifications thereof, and have shown the same as designed for use in connection with an automobile battery but it is to be understood that the apparatus as a whole, as well as the several parts thereof, may take various forms and may be used in connection with battery operated mechanisms of various kinds without departing from the spirit of the invention.

In each of the several forms of the invention here illustrated a normally deenergized signal circuit is connected with a main circuit, in the present instance the ignition circuit for an internal combustion engine, and means are provided for energizing the signal circuit when the level of the electrolyte falls below a predetermined safe level. In that form of the apparatus illustrated in Fig. 1 a wet cell battery 10 is connected with the ignition circuit 11 by the usual ignition switch 12. A signal circuit 13 is connected at one end with the ignition circuit beyond the switch 12 and is grounded at its other end, as shown at 14. A signal of any suitable kind may be connected in the signal circuit 13 and in the present instance this signal is shown as a glow lamp 15. Interposed in the signal circuit between the ignition circuit and the signal is a switch 16, which, in the form shown, comprises two fixed contacts 17 and a movable contact 18. The movable contact is carried by a lever 19 which is pivotally mounted at 20 on a fixed support and is biased towards switch closing position by a spring 21. Means are provided for opening the switch 16 when the ignition circuit is closed and for automatically closing the same if the electrolyte in the battery falls below a predetermined level. In the present instance the switch 16 is controlled by an electromagnet 22, the armature 23 of which is carried by the lever 19. The winding of the magnet is grounded at one end, as shown at 24, and the other end thereof is connected by a circuit 25 with an electrode 26 which extends into the battery 10 a predetermined distance below the normal level of the electrolyte in the battery. When the circuit 25 is closed and the electrode extends into the electrolyte the magnet 22 will be energized to open the switch 16 and retain the same open whenever the ignition switch is closed. To prevent the magnet 22 from drawing current from the battery when the ignition switch is open there is interposed in the electrode circuit 25 a normally open switch 27 and means are provided for closing that switch when the ignition switch is closed. As shown, the switch 27 comprises two fixed contacts 28 and a movable contact 29 carried by a lever 30 pivotally mounted at 31 on a fixed axis and biased towards switch opening position by a spring 32. The lever also carries the armature 33 of an electromagnet 34 the winding of which is connected at one end, by a conductor 35, with the ignition circuit beyond the ignition switch, the other end of the winding being grounded at 36. Thus when the ignition switch is closed the magnet 34 is energized to close the electrode circuit 25.

In Fig. 1 the several parts of the apparatus are shown in the positions which they occupy when the ignition switch 12 is open. It will be noted that the switch 16 of the signal circuit is closed but inasmuch as the ignition switch is open the signal circuit is deenergized and draws no current from the battery. The switch 27 of the electrode circuit is also open and the ignition switch being open, this magnet draws no current from the battery. When the ignition switch is closed, and there is sufficient electrolyte in the battery, the magnet 34 is energized to close the electrode circuit and thereby energize the magnet 22 to open the signal circuit and to retain the same open so long as the ignition switch is closed and there is sufficient electrolyte in the battery to close the electrode circuit. If the electrolyte in the battery falls to a level below the lower end of the electrode 26 the electrode circuit is opened, thereby deenergizing the magnet 22 and permitting the switch 16 to be closed by a spring 21 to energize the signal circuit. So long as there is insufficient electrolyte in the battery the signal circuit will be energized whenever the ignition switch is closed, thereby constantly indicating to the operator the fact that his battery requires additional electrolyte. Preferably the electrode circuit 25 is provided with a normally closed manually operated switch 37 whereby the electrode circuit may be manually opened at any time while the ignition circuit is closed to determine whether or not the apparatus is in proper operating condition. If the signal circuit is energized the signal of course indicates that the apparatus is working properly and if the signal circuit is not energized under those conditions the necessary corrections can be made.

The electrode may be mounted in the battery in any suitable manner and a very satisfactory arrangement is shown in Fig. 5. As there shown a hollow plug 38 is mounted in an opening in the battery casing and the electrode 26 is secured therein by a bolt 39 extending through the top wall of the plug and connected with the electrode circuit 25 by a nut 40 clamping the conductor to the bolt. The plug 38 is preferably provided with a small diameter bore 41 to vent the battery.

In that embodiment of the invention illustrated in Fig. 2 the energization of the signal circuit is controlled by the electrode circuit without the use of relays. In that figure the battery 10 and the electrode 26 are the same as shown in Figs. 1 and 5. The ignition circuit 42 is provided with the usual switch 43 and beyond the switch is connected with various instrumentalities, such as the timer or points 44, a high tension coil 45 and a distributor 46. The signal circuit 47 is grounded at one end, as shown at 48, and is connected at its other end with the ignition circuit 42 beyond the high tension coil, by a circuit 49 having therein a relatively high resistance, such as a high value resistor 50. The circuits 47 and 49 are connected between the signal 47a and the resistor 50 with the electrode 26 by an electrode circuit 51. The circuit 51 offers to the flow of current therethrough a resistance substantially less than that offered to the flow of current through the signal circuit 47 and the signal 47a. Therefore, so long as the electrode extends into the electrolyte of the battery, the current from the ignition circuit will flow through the resistor circuit 49 and the electrode circuit 51 to the battery and the current is so reduced by the resistor that little, if any, current will enter the signal circuit and any current that may enter the signal circuit will be insufficient to energize the signal. If the electrode circuit 51 is opened by the falling of the electrolyte to a level below the electrode the current will flow through the circuit 49 to the signal circuit and the signal will be energized. The electrode circuit may, if desired, be provided with a test switch 37a.

That embodiment of the invention shown in Fig. 3 is generally similar to the embodiment shown in Fig. 2 but a transformer, instead of a conventional resistor, is interposed between the ignition circuit and the signal circuit. As shown in this figure the ignition circuit 52 is connected beyond the ignition switch 53 with a high tension coil 54 and with the usual instrumentalities. The primary winding 55 of a transformer is connected across the ignition circuit in advance of the high tension coil, and a condenser 56 is preferably interposed in the transformer circuit. The secondary winding 57 of the transformer is grounded at one end, as shown at 58, and the other end thereof is connected by a conductor 59 with the signal circuit 60 in which the signal 61 is connected. Connected with the circuits 59 and 60 between the signal and the transformer is an electrode circuit 62 which is connected with the electrode 26 in the battery. The electrode circuit having less resistance than the signal circuit the current from the transformer will flow through the conductor 62 and the electrode circuit to the battery so long as the electrode is immersed in the electrolyte in the battery. If the electrolyte falls to a level below the electrode the electrode circuit will of course be opened and the current will flow from the conductor 59 to the signal circuit. This form of the invention may also be provided with a test switch 37b. It will be noted that in this embodiment of the invention the current is taken from the ignition circuit in advance of the high tension coil thus avoiding any reduction in the high tension current delivered to the various instrumentalities of the automobile or other mechanism.

In Fig. 4 there is illustrated an embodiment of the invention which utilizes the transformer, as shown in Fig. 3 but in which the connection between the transformer and the signal circuit is controlled by an automatically operated switch. The ignition circuit 63 is connected beyond the ignition switch 64 with the usual distributor and a high tension coil 65 and the primary winding 66 of the transformer is connected across the ignition circuit in advance of the high tension coil, all substantially shown in Fig. 3. The secondary winding 66 of the transformer is connected, at one end, by a conductor 67 with the signal circuit 68 through a normally open switch 69, the fixed contact 70 of which is connected with the conductor 67 and the movable contact 71 of which is connected with the signal circuit and is carried by an arm 72 pivotally mounted at 73 and biased to switch opening position by a spring 74. The arm 72 carries the armature 75 of an electromagnet 76, one end of the winding 77 of which is connected with the conductor 67 between the fixed contact 70 and the transformer. The other end of the winding 77 is connected with an electrode circuit 78 which is connected with the electrode 26 in the battery 10. That end of the secondary winding of the transformer opposite the end connected with the conductor 67 is connected by a conductor 79 with the electrode circuit 78. The output current from the transformer is divided into two parts and, as here shown, the secondary winding is grounded at substantially the center thereof thus dividing the output current into approximately equal parts, one of which, when the switch 69 is open, flows through the magnet winding 77 and the electrode circuit to the battery and the other part of which flows through the conductor 79 to the electrode circuit. The winding of the magnet 76 is such that substantially the full output of the transformer is required to energize the magnet sufficiently to close the switch 69 and inasmuch as under normal conditions the winding receives only approximately one-half of the transformer's output, the switch 69 remains open as long as the electrode circuit is closed. If the electrolyte falls to a level below the electrode and thereby opens the electrode circuit, the entire output from the transformer will flow through the conductor 67, the magnet winding, a portion of the electrode circuit 78, and the conductor 79 back to the transformer. Thus the magnet will be energized to close the switch 69 and the transformer output will flow through that switch to the signal circuit as long as the electrode circuit remains open and the ignition circuit remains closed. The electrode circuit may be provided with a test switch 37c.

While I have shown and described certain embodiments of my invention, I wish it to be understood that I do not desire to be limited to the details thereof, as many modifications may occur to a person skilled in the art.

Having now fully shown and described my invention, what I claim as new and desire to secure by Letters Patent, is:

1. In an apparatus comprising a main circuit, a wet cell battery to supply current to said circuit and a main switch to control the connection between said battery and said circuit, a signal circuit connected with said main circuit on that side of said main switch which is opposite said battery, a signal in said signal circuit, a self-closing and normally closed signal switch in said signal circuit, means for opening said signal switch simultaneously with the closing of said main switch, said means including an electromagnet, an electrode extending into said battery to a point below the normal level of the electrolyte therein, and a circuit connecting said electrode with said magnet to energize said magnet when said electrode extends into said electrolyte and to deenergize said magnet and release said switch for closing movement when said electrolyte is out of contact with said electrode, and means controlled by said main switch to deenergize said magnet when said main switch is opened, regardless of the amount of electrolyte in said battery.

2. In an apparatus comprising a main circuit, a wet cell battery to supply current to said circuit and a main switch to control the connection between said battery and said circuit, a signal circuit connected with said main circuit on that side of said main switch which is opposite said battery, a signal in said signal circuit, a self-closing and normally closed signal switch in said signal circuit, means for opening said signal switch simultaneously with the closing of said main switch, said means including an electromagnet, an electrode extending into said battery to a point below the normal level of the electrolyte therein, and a circuit connecting said electrode with said magnet to energize said magnet when said electrode extends into said electrolyte and to deenergize said magnet and release said switch for closing movement when said electrolyte is out of contact with said electrode, a switch in said electrode circuit, and means controlled by said main switch for closing the last mentioned switch when said main circuit is closed and for opening the same when said main circuit is opened.

3. In an apparatus comprising a main circuit, a wet cell battery to supply current to said circuit and a main switch to control the connection between said battery and said circuit, a signal circuit connected with said main circuit on that side of said main switch which is opposite said battery, a signal in said signal circuit, a self-closing and normally closed signal switch in said signal circuit, means for opening said signal switch simultaneously with the closing of said main switch, said means including an electromagnet, an electrode extending into said battery to a point below the normal level of the electrolyte therein, and a circuit connecting said electrode with said magnet to energize said magnet when said electrode extends into said electrolyte and to deenergize said magnet and release said switch for closing movement when said electrolyte is out of contact with said electrode, a self-opening switch in said electrode circuit, an electromagnet for closing said switch, and a circuit for the last mentioned magnet connected with said main circuit beyond said main switch, whereby the closing of said main switch will close the switch in said electrode circuit and thereby energize the first mentioned magnet and open the switch in said signal circuit and the opening of said main switch will deenergize both magnets.

ROBERT P. DE ANTHONY.

References Cited in the file of this patent
UNITED STATES PATENTS

| Number | Name | Date |
|---|---|---|
| 1,818,185 | Yull | Aug. 11, 1931 |
| 2,064,460 | Carr et al. | Dec. 15, 1936 |
| 2,148,657 | Smith | Feb. 28, 1939 |
| 2,159,531 | Polin | May 23, 1939 |
| 2,511,631 | Gordon | June 13, 1950 |